(12) United States Patent
Williams

(10) Patent No.: US 8,046,888 B2
(45) Date of Patent: Nov. 1, 2011

(54) YOKE ASSEMBLY AND METHOD OF INSTALLING SAME

(75) Inventor: Stephen Michael Williams, Covington, GA (US)

(73) Assignee: The Southern Company, Atlanta, GA (US)

(*) Notice: Subject to any disclaimer, the term of this patent is extended or adjusted under 35 U.S.C. 154(b) by 934 days.

(21) Appl. No.: 11/946,254

(22) Filed: Nov. 28, 2007

(65) Prior Publication Data

US 2008/0120822 A1    May 29, 2008

Related U.S. Application Data

(60) Provisional application No. 60/867,533, filed on Nov. 28, 2006.

(51) Int. Cl.
*B23P 19/04* (2006.01)
(52) U.S. Cl. ............. 29/238; 29/270; 29/402.8; 29/278; 254/134.3 PA; 254/134.3 FT
(58) Field of Classification Search ......... 254/134.3 FT, 254/134.3 R, 134.3 PA; 29/238, 270, 278, 29/255, 402.8
See application file for complete search history.

(56) References Cited

U.S. PATENT DOCUMENTS

| | | | | |
|---|---|---|---|---|
| 2,039,499 A | * | 5/1936 | Taylor | 248/58 |
| 2,938,678 A | * | 5/1960 | Hrovat | 242/151 |
| 3,912,226 A | * | 10/1975 | Jackson | 254/134.3 PA |
| 4,298,185 A | * | 11/1981 | Janssen | 256/41 |
| 2008/0054235 A1 | * | 3/2008 | Devine et al. | 254/134.3 PA |
| 2008/0120822 A1 | * | 5/2008 | Williams | 29/402.08 |

FOREIGN PATENT DOCUMENTS

| | | |
|---|---|---|
| GB | 370983 | 4/1932 |
| GB | 507834 | 6/1939 |
| JP | 51-113187 | 10/1976 |
| JP | 52-090092 | 7/1977 |
| JP | 62-267729 | 11/1987 |
| JP | 07-296742 | 11/1995 |
| JP | 07-317305 | 12/1995 |
| JP | 07-322436 | 12/1995 |
| JP | 08-190864 | 7/1996 |
| JP | 09-051615 | 2/1997 |
| JP | 2001-037039 | 2/2001 |

* cited by examiner

*Primary Examiner* — Lee D Wilson
(74) *Attorney, Agent, or Firm* — Ryan A. Schneider, Esq.; Dustin B. Weeks, Esq.; Troutman Sanders LLP

(57) ABSTRACT

A yoke assembly includes two support members that are connected to one another, both of which include respective first ends and second ends. The support members are spaced apart enough to fit over existing hardware on a T-adapter at a dead end. In proximity to the first end of the two support members, a connection member is connected to the support members for securing the yoke assembly to the T-adapter. The yoke assembly includes a pole connector, which is pivotably positioned in proximity to the second end of each support member, wherein the pole connector is positioned between the two support members and secured thereto by the second pin. A pole can be secured between the pole connector of the yoke assembly and the power pole, reducing stress on an insulator for removing/repairing the insulator.

20 Claims, 10 Drawing Sheets

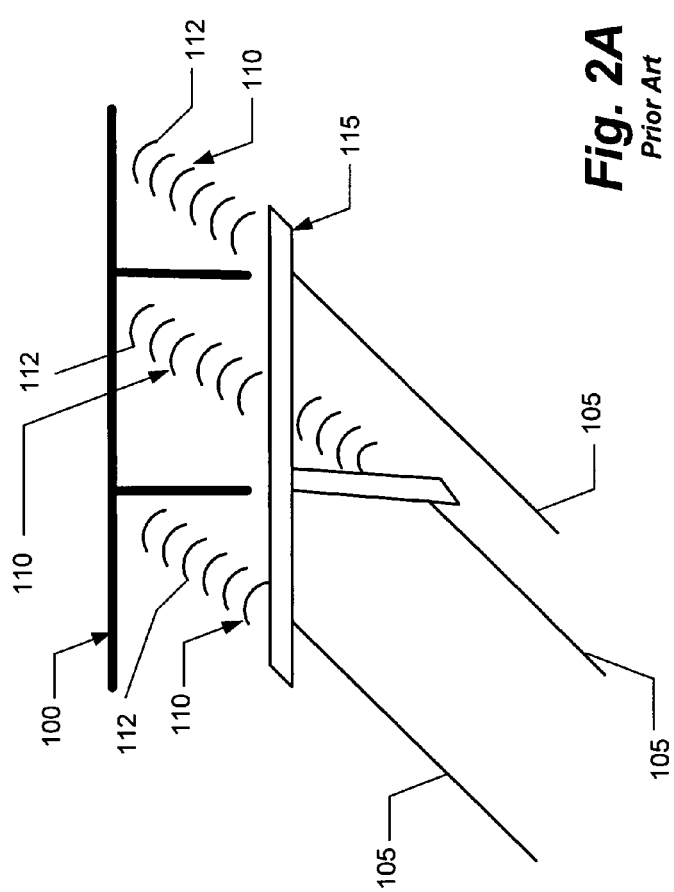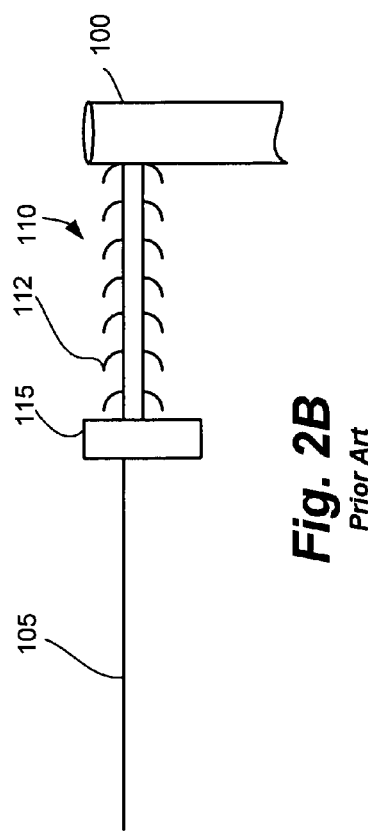
Fig. 2A
Prior Art
Fig. 2B
Prior Art

YOKE ASSEMBLY AND METHOD OF INSTALLING SAME

CROSS REFERENCE TO RELATED APPLICATION

This application claims benefit, under 35 U.S.C. § 119(e), of U.S. Provisional Application Ser. No. 60/867,533, filed 28 Nov. 2006, the entire contents and substance of which is hereby incorporated by reference.

BACKGROUND

1. Field of the Invention

The present invention relates to power line tools and, more specifically, to a yoke assembly for reducing strain on an insulator string in a dead end power line arrangement.

2. Description of Related Art

Transmission power lines are wires or conductors through which high voltage electric power is moved from point to point. Transmission power lines are fastened to large transmission power poles. For safety reasons, this fastening typically occurs well above the ground. FIG. 1 is an illustration of a series of transmission power poles 100 carrying at least three conductors 105.

Transmission power poles 100 often include a number of dead ends, which are the termination of a power grid. An exemplary dead end is shown in FIGS. 2A-2B, such that between the transmission power pole 100 and each conductor 105 are an insulator string 110 comprising a plurality of insulators 112 and a connector adapter 115. The conductor 105 is not connected to another conductor, and thus terminates at the dead end. For example, the three conductors 105 of FIG. 2A terminate at the insulators 112.

Commonly, insulators 112 are made of a material that does not conduct electricity, such as glass, ceramic, porcelain, or rubber, which resist the flow of electric current. A purpose of the insulators 112 is to prohibit electricity passing from the conductor 105 to the pole 100, and is intended to support/separate electrical conductors without passing current therethrough. Because the transmission power pole 100 may be made of conductive material, e.g., metal, the insulator 112 must be positioned between the conductor 105, which is carrying the electricity, and the power pole 100. Otherwise, the power pole 100 could become conductive, such that the pole 100, itself, is powered with the electricity, which would be dangerous and hence is not desirable.

The adapter 115 connects the conductors 105 to the insulator string 110 and acts a bridge between same. Conventionally, the adapter 115 is T-shaped, such that the three conductors 105 are distanced from each other enough, as to not interfere with the transmission of power or compromise the safety of those in proximity to the power pole 100. Preferably, the three conductors 105 terminate roughly at the three endpoints of the "T." In this arrangement, the insulator string 110 must be taut in order to be connected to the T-adapter 115, and yet still support the conductors 105.

Unfortunately, some or all of the insulators 112 in the insulator string 110 can become damaged, and/or may need repair. In other situations, the insulators 112 may need to be replaced. Consequently, manufactures have designed assemblies to enable the removal of an insulator string 110 or individual insulators 112, while still maintaining the necessary strain on the conductor 105. Conventionally, a yoke plate, having one or two arms extending between the yoke plate and the transmission power pole, is used to generate the force required to slacken the strain on the insulator string 110, such that it can be repaired and/or removed.

Conventional yoke plates enabling the repair/removal of insulators slide between and around existing hardware on the T-shaped dead end adapter. The yoke plates depend on angled pins, bolts, and the like (herein referred as the "hardware") for securing to the T-shaped adapter to both the insulator string and the conductor(s). Certainly, by sliding the yoke between and around the adapter, it makes the installation of the yoke difficult. In fact, it can be awkward and problematic to obtain an accurate fit. When replacing/repairing transmission line insulator strings, an operator may be positioned a couple hundred feet above the earth, so it is desirable to enable the process of repairing/removing insulators to occur as safely, easily, and as quickly as possible.

What is needed, therefore, is a yoke assembly to safely and easily secure to an adapter to improve the repair/removal of an insulator string. It is to such a device, method, and system that the present invention is primarily detected.

SUMMARY

Briefly described, in preferred form, the present invention is a yoke assembly for relieving stress/strain on an insulator. The yoke assembly includes two support members, e.g., longitudinal extending plates, which are connected to one another. Both the plates include respective first ends and second ends. A first connection assembly is positioned approximately at the midpoint of the two plates for connecting the two plates. The plates are spaced apart enough to fit over existing hardware on a T-adapter at the dead end. In proximity to the first end of the two plates, a slot or notch is provided for receiving a flange of the T-adapter that the yoke assembly rests upon. In proximity to the first end of the two plates a connection adapter is pivotably connected thereto for securing the yoke assembly to the T-adapter. In proximity to the second end of each plate a second connection assembly is connected thereto. The yoke assembly includes a pole connector, which is pivotally positioned in proximity to the second end of each plate, wherein the pole connector is positioned between the two plates and secured thereto by the connection assembly. An arm or pole can be secured between the yoke assembly and the power pole, reducing stress on an insulator for removing/repairing the insulator.

The present invention also relates to an improved method of installing or securing the yoke assembly to the adapter. Instead of installing the yoke assembly between hardware the adapter that connects the conductor and insulator string to the adapter, the present invention makes it easier to install same by being installed over or around the adapter and its hardware.

These and other objects, features and advantages of the present invention will become more apparent upon reading the following specification in conjunction with the accompanying drawing figures.

BRIEF DESCRIPTION OF THE DRAWINGS

FIG. 2A is a system view of a conventional connection between a number of conductors and a number of insulator strings for a transmission line dead end.

FIG. 2B is a side system view of the conventional connection between conductors and insulators for a dead-end.

DETAILED DESCRIPTION

Figure 1:
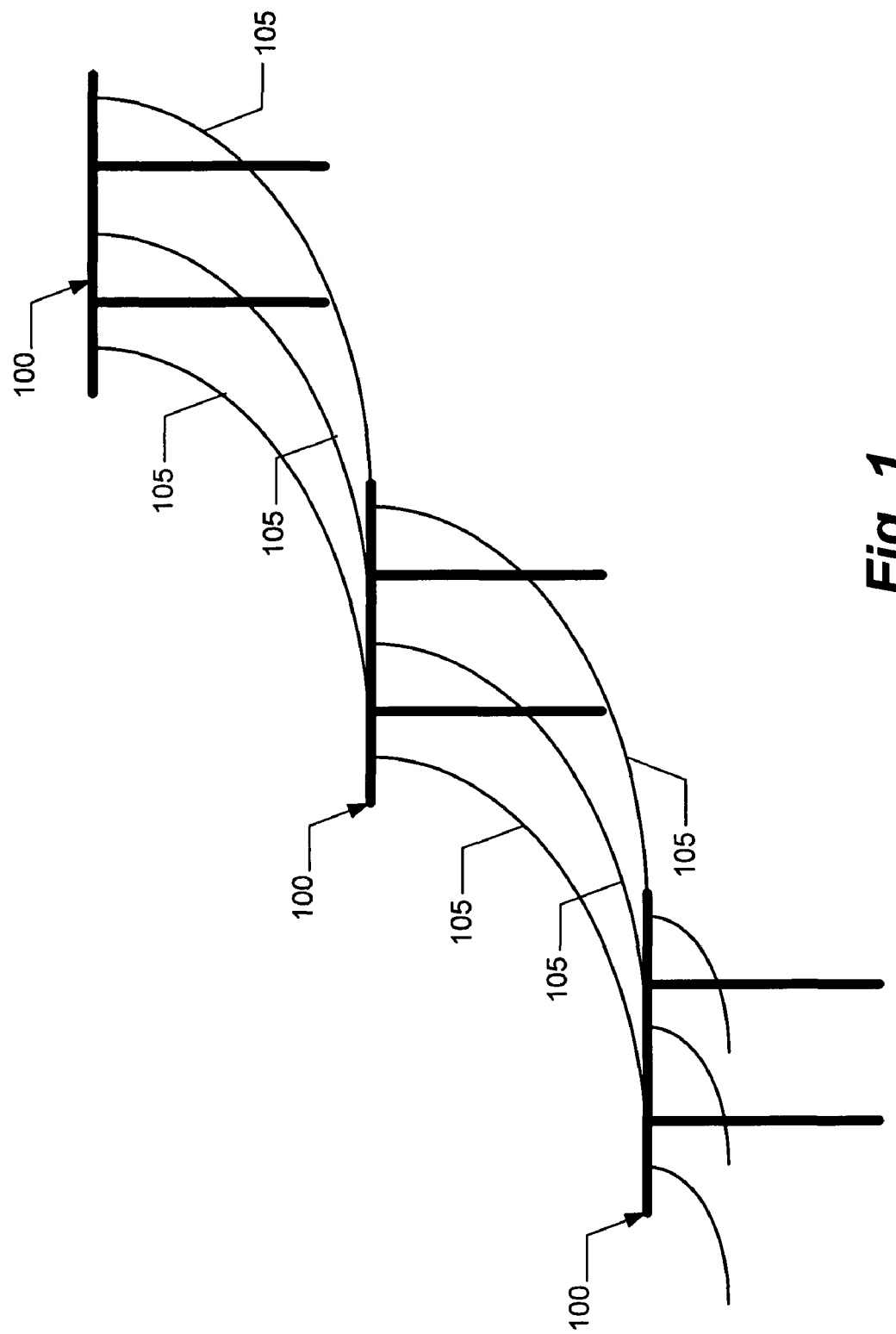
FIG. 1 is a view of a conventional transmission line system.

To facilitate an understanding of the principles and features of the invention, it is explained hereinafter with reference to its implementation in an illustrative embodiment. In particular, the invention is described in the context of being a yoke assembly for removing stress and/or strain on transmission line insulator strings for replacing/repairing such insulators on dead ends of transmission power systems. In a preferred embodiment, the present invention is a yoke for 500 kV transmission power lines.

The invention, however, is not limited to its use as a yoke assembly for transmission line insulators. Rather, the invention can be used when a device for removing/repairing an insulator is desired, or as is necessary. Thus, the device described hereinafter as a yoke assembly can also find utility as a device for other applications, beyond that of transmission power systems.

The material described hereinafter as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Referring now to the figures, wherein like reference numerals represent like parts throughout the view, the present invention will be described in detail. The present invention comprises a yoke assembly.

Figure 3:
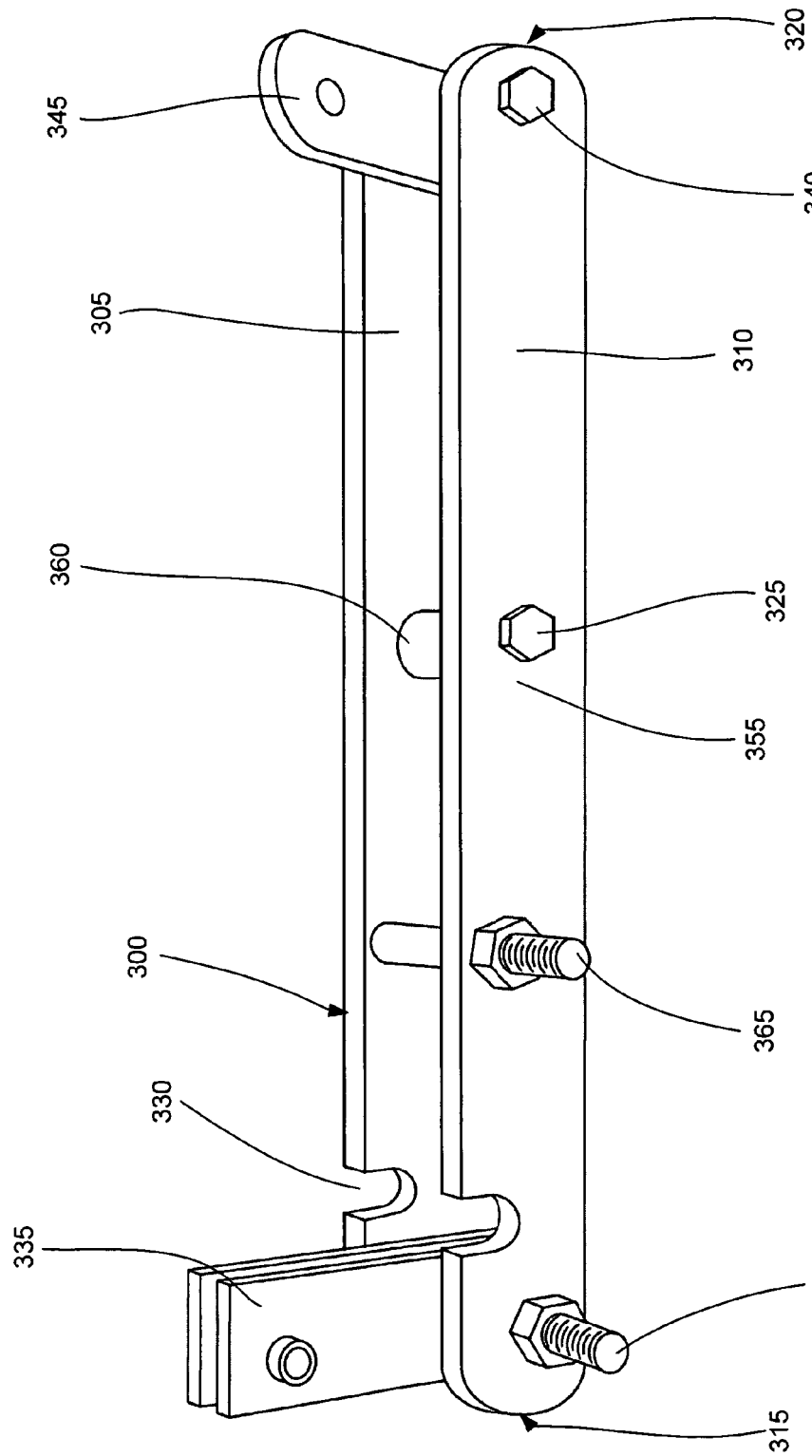
FIG. 3 is a perspective view of a yoke assembly, in accordance with an exemplary embodiment of the present invention.

As shown in the FIGS. 3-7 and 9-10, particularly shown up-close in FIG. 3, the yoke assembly 300 for reducing the strain on an insulator string 110 containing a plurality of insulators 112 includes two support members, e.g., longitudinal extending plates 305 and 310, which are in communication with to one another. Specifically, the plates 305 and 310 are connected to one another by a number of connection assemblies. Each of the plates 305 and 310 include a respective first end 315 and a second end 320, and generally have the same size and shape.

A first connection assembly 325 can be positioned approximately at the midpoint 355 of the two plates 305 and 310 for connecting them together. The connection assembly 325 can preferably be a bolt/nut combination. Preferably, the plates 305 and 310 are spaced apart enough to fit over existing hardware on an adapter 115 at the dead end of a transmission power system. More preferably, the plates 305 and 310 are sufficiently spaced apart enabling them to fit over existing hardware on the adapter 115 having a T-shape.

In proximity to the first end 315 of the two plates 305 and 310, a slot or notch 330 is provided and adapted to receive a flange of the T-adapter 115. The yoke assembly 300 can rest upon the T-adapter 115 because of this slot/notch 330. Also in proximity to the first end 315, a connection member 335 is releasably connected for securing the yoke assembly 300 to the T-adapter 115.

In proximity to the second end 320 of the plates 305 and 310, a second connection assembly 340 is positioned to further connect the plates 305 and 310 together. The yoke assembly 300 includes a pole connector assembly 345, which is pivotably positioned in proximity to the second end 320 of the plates 305 and 310, wherein the pole connector assembly 345 is positioned between the two plates 305 and 310 and secured thereto by the second connection assembly 340, preferably a bolt/nut combination.

Based on the pole connector assembly 345, an elongated arm or pole 350 (see FIG. 6) can be secured between the yoke assembly 300 and the cold end, i.e., the structure, e.g., power pole 100, for reducing stress on an insulator string 110 enabling removing/repairing the insulator string 110.

In a preferred embodiment of the present invention, the two plates 305 and 310 are positioned approximately parallel to one another. The plates 305 and 310 can have an elongated, generally oval shape, as illustrated in the figures. As one skilled in the art would appreciate, the plates 305 and 310 can have other shapes, such as rectangular or the like. The plates 305 and 310 are preferably connected by at least one permanent connection assembly 325, such as a bolt/nut, for securing the two plates 305 and 310 together. The connection assembly 325 is positioned in the approximate midpoint 355 of the two plates 305 and 310, such that the connection assembly 325 will not interfere with the connection between the yoke assembly 300 to the T-adapter 115. The connection assembly 325 can be received by a hollow cylinder 360 for safe keeping and to reduce moments of force on the connection assembly 325. The hollow cylinder 360 is connected, for example welded, to each plate 305 and 310. Further, the hollow cylinder 360 can include a threaded center having a diameter similar in size to the diameter of the threading of the connection assembly 325, for further securing of the connection assembly 325. Although, in another embodiment, the hollow cylinder 360 can be outfitted without a threaded center, and thus the connection assembly 325 may not have a threading along its body.

Preferably, the plates 305 and 310 are made of a metal, including aluminum, steel, cast iron, and the like. The connection assembly 325, in a preferred embodiment, can be a grade 8 bolt, which is rust-resistant. The connection assembly 325 can comprise the bolt, which can be secured to the plates 305 and 310 by a cooperatively fitting nut.

As illustrated in FIGS. 4-7 and 9-10, the yoke assembly 300 is positionable outside, over, and around the hardware on the T-adapter 115, which secures the conductors 105 to the insulator strings 110. The conventional system of installing a yoke was to fit the yoke assembly between and through the existing hardware on the adapter, which proved to be time-consuming, challenging, and dangerous.

Figure 4:
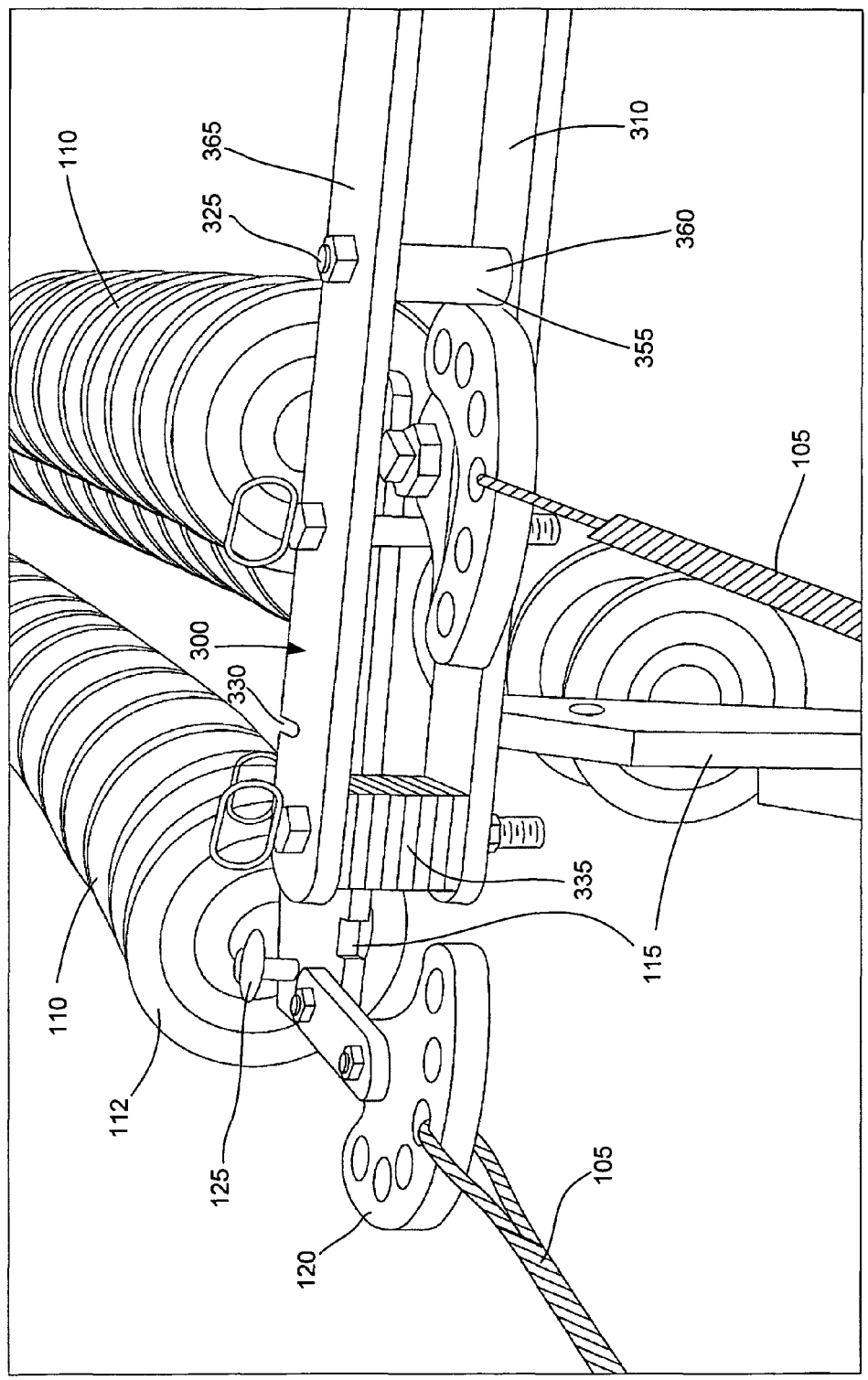
FIG. 4 is a top, perspective view of the yoke assembly secured to an adapter, in accordance with an exemplary embodiment of the present invention.
Figure 5:
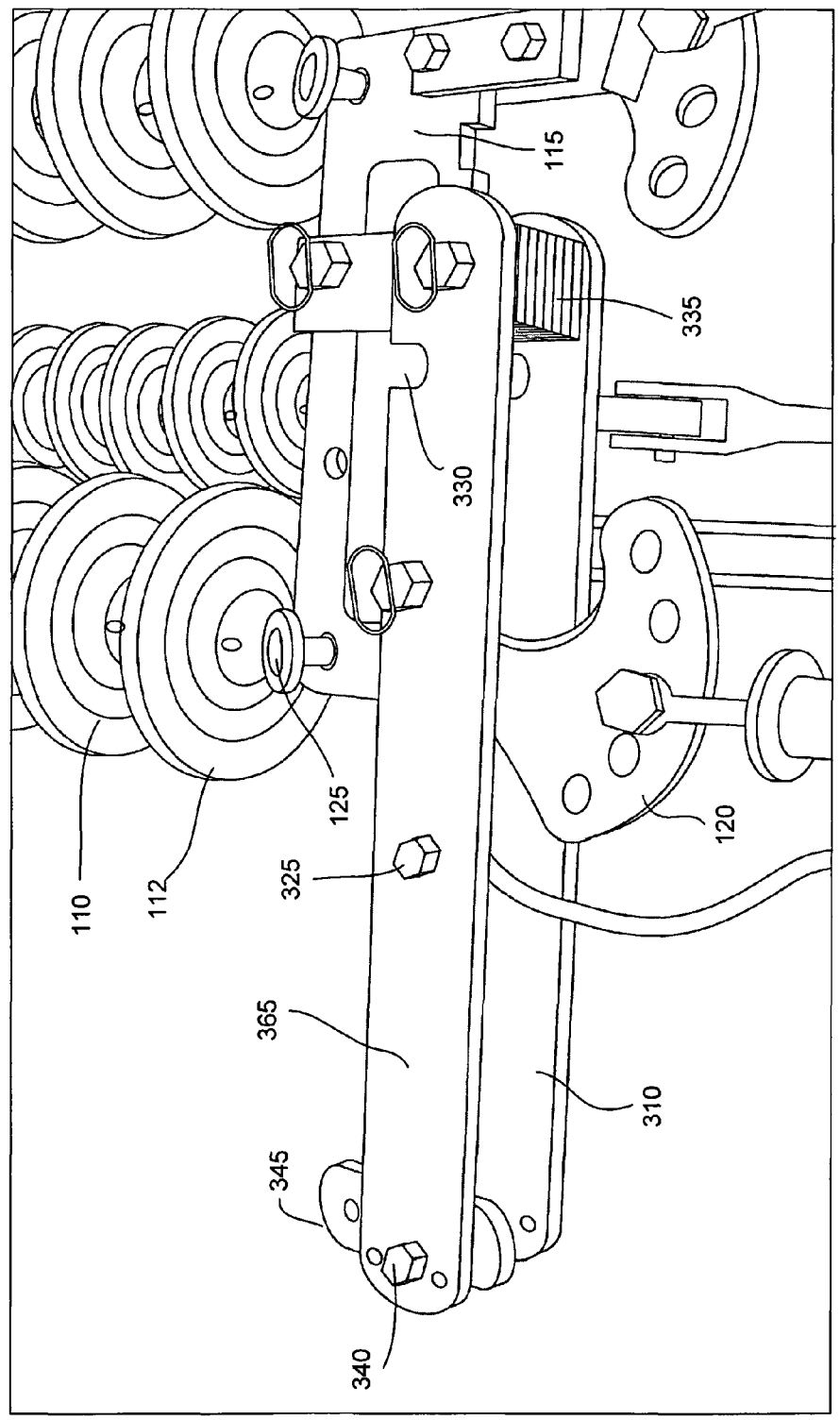
FIG. 5 is another top, perspective view of the yoke assembly secured to the adapter, in accordance with an exemplary embodiment of the present invention.
Figure 6:
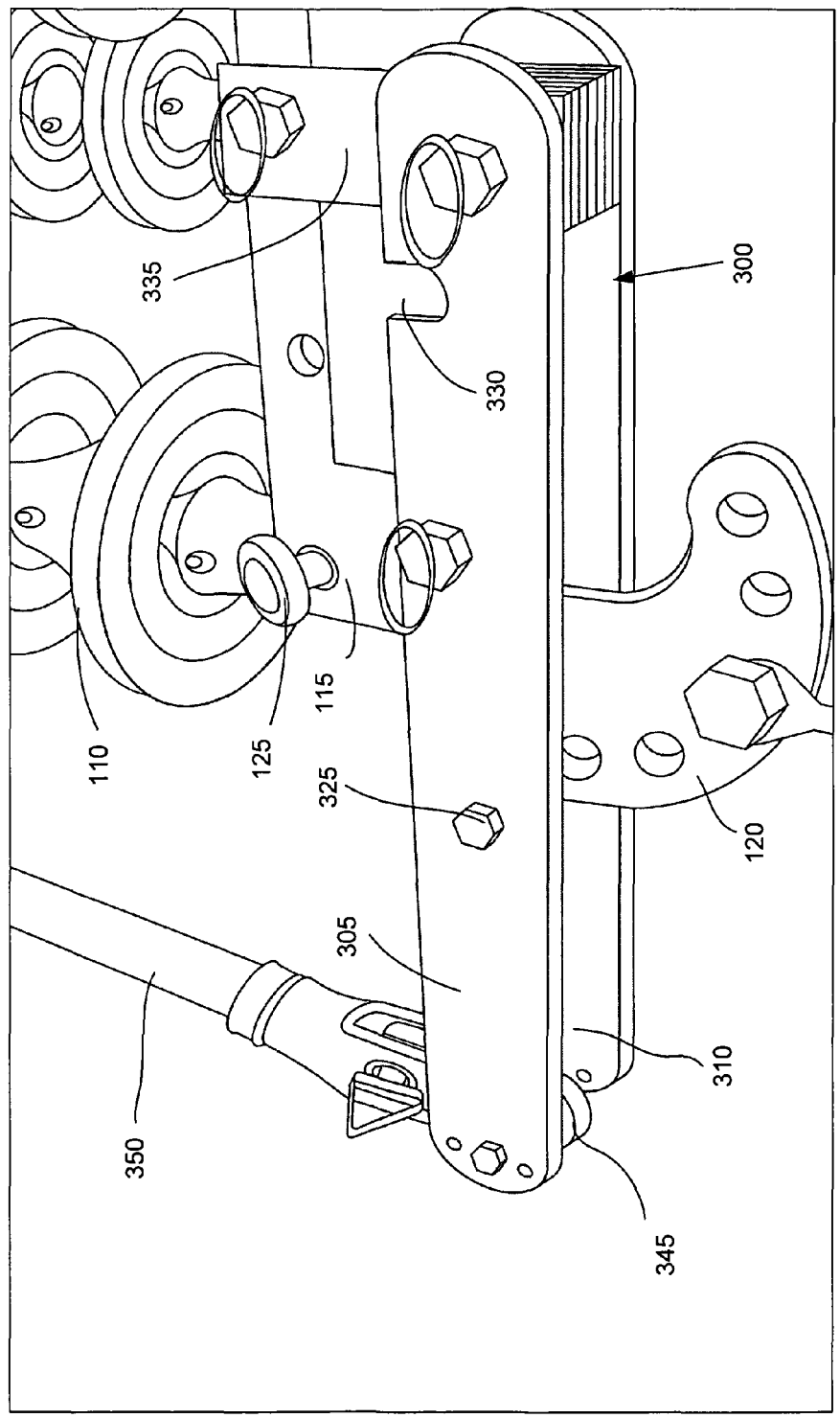
FIG. 6 is a top, perspective view of the yoke assembly secured to the adapter with a pole attached to the yoke assembly, in accordance with an exemplary embodiment of the present invention.

Generally, the T-adapter 115 includes hardware such as angled bolts to secure the conductors 105 or insulator strings 110 thereto. For instance, as illustrated in FIG. 4, the conductors 105 are connected to a conductor connection member 120, which connects the conductor 105 to the T-adapter 115. And the insulator strings 110 are connected to an insulator connection member 125 to secure the insulator strings 110 to the T-adapter 115. In one embodiment, for example, the insulator connection member 125 can comprise angled bolts, while the conductor connection member 120 comprises conventional bolts.

Unlike conventional yoke plates, the present yoke assembly 300 is adapted to fit over the hardware of the T-adapter 115, rather than between the hardware, easing the task of securing the yoke assembly 300 to the T-adapter 115. For example, conventional dead end yoke plates were weaved between the conductor connection member 120 and the insulator connection member 125 to secure to the T-adapter 115. In fact, the conventional solution required placing the plates at an angle in order to fit and slide through the hardware.

The plates 305 and 310 of the present yoke assembly 300 are adapted to slide over the conductor connection member 120. By sliding and positioning over the T-adapter's hardware, the process of installation is significantly improved, as time is saved, and the installer's task is eased.

That said, the yoke assembly 300 can be secured to the T-adapter 115 via the plate 305 sitting atop the conductor connection member 120, the connection member 335 mounted on the T-adapter 115, the notch 330 engaging a flange of the T-adapter 115, and the leverage point bolt/pin 365.

Figure 7:
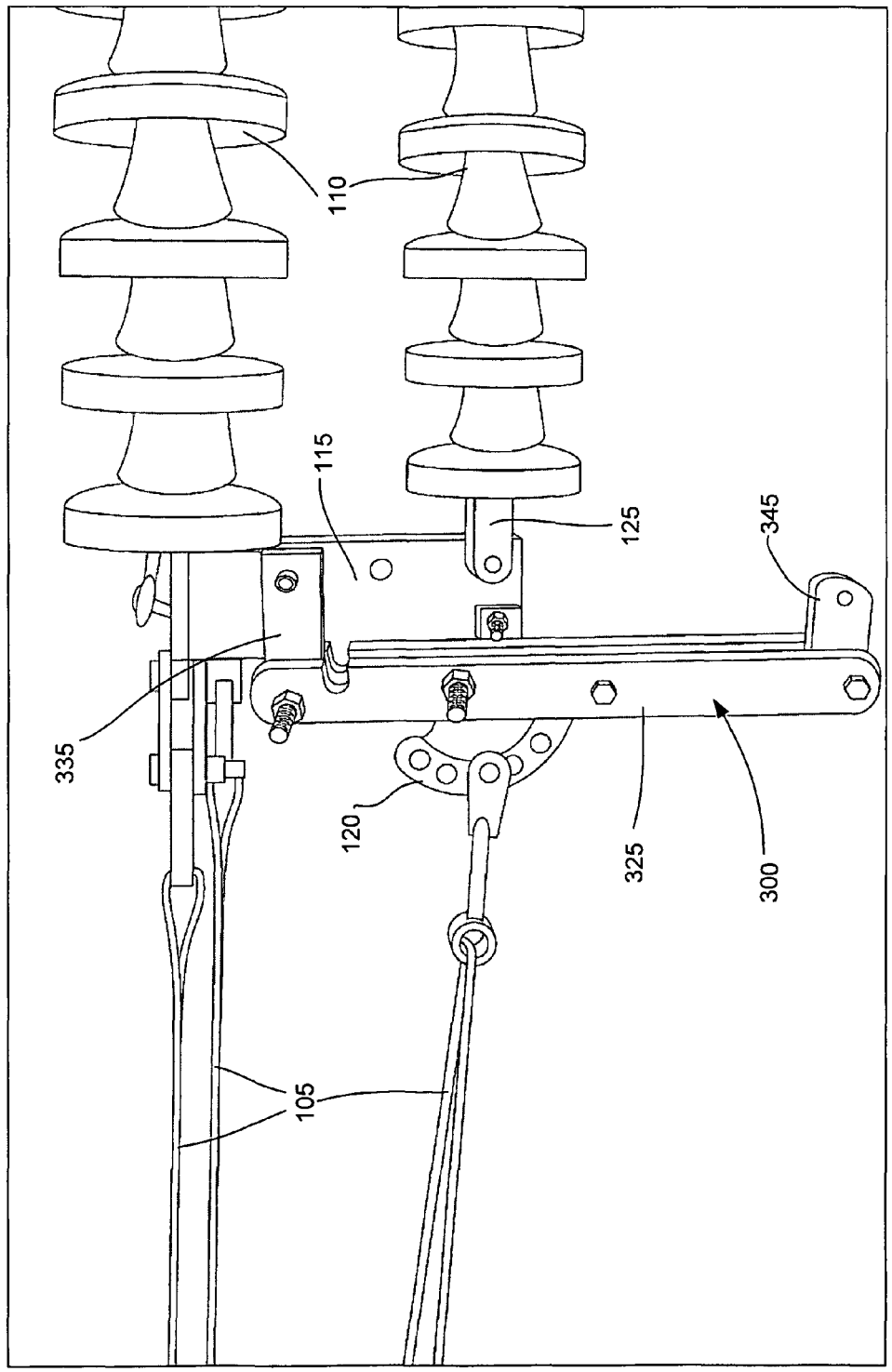
FIG. 7 is a side, perspective view of the yoke assembly secured to the adapter, in accordance with an exemplary embodiment of the present invention.

As described, the plates 305 and 310 of the yoke assembly 300 can rest upon the conductor connection member 120, depending on which insulator string 110 is being repaired/replaced. But this only occurs when the yoke assembly 300 is generally horizontally positioned, as illustrated in FIGS. 4-6 and 9-10. The yoke assembly 300 can be positioned in a generally vertical position, as shown in FIG. 7, for which the plate 305 does not rest upon the conductor connection member 120, but is connected thereto.

Figure 8:
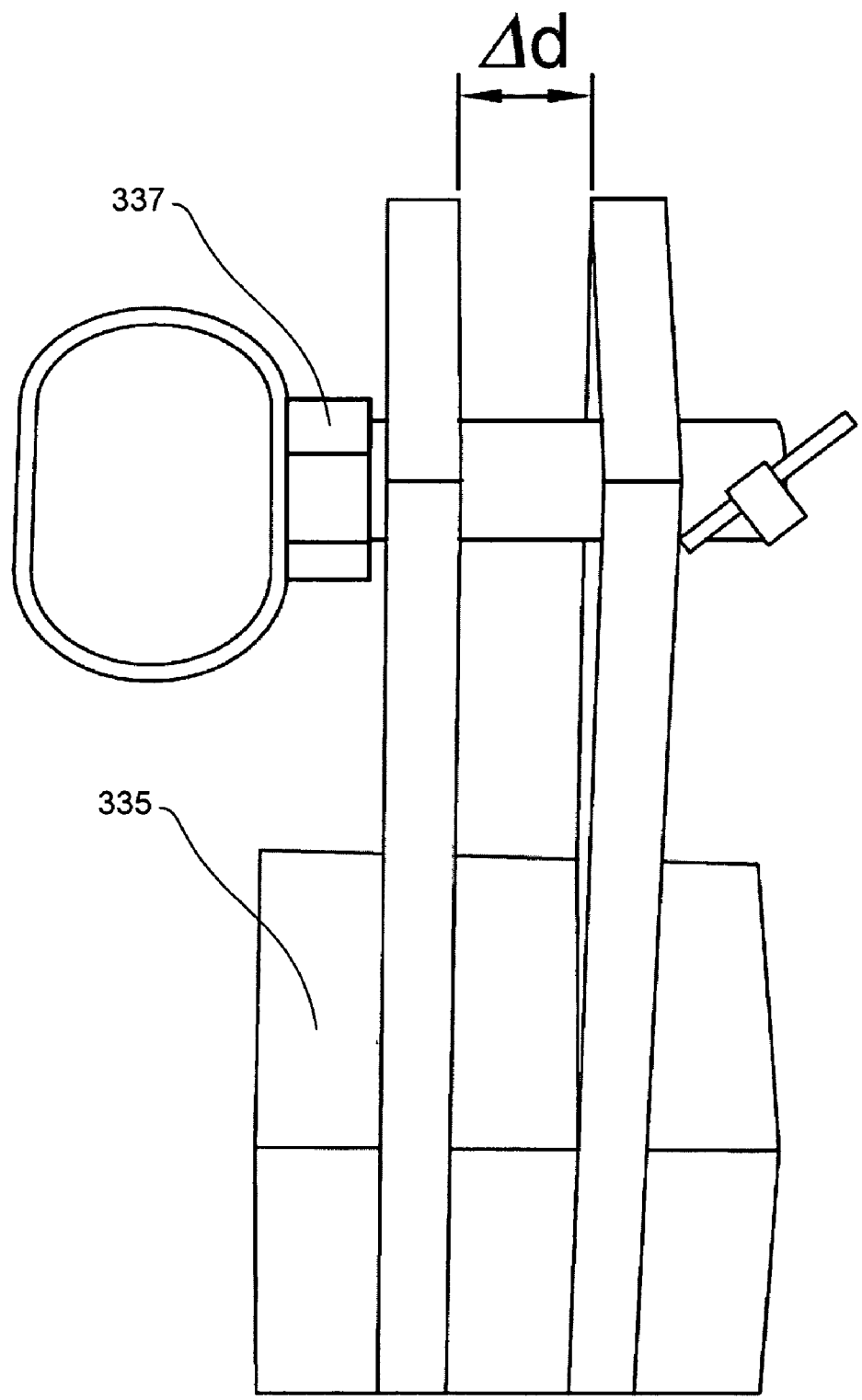
FIG. 8 is a perspective view of a yoke connection member, in accordance with an exemplary embodiment of the present invention.
Figure 9:
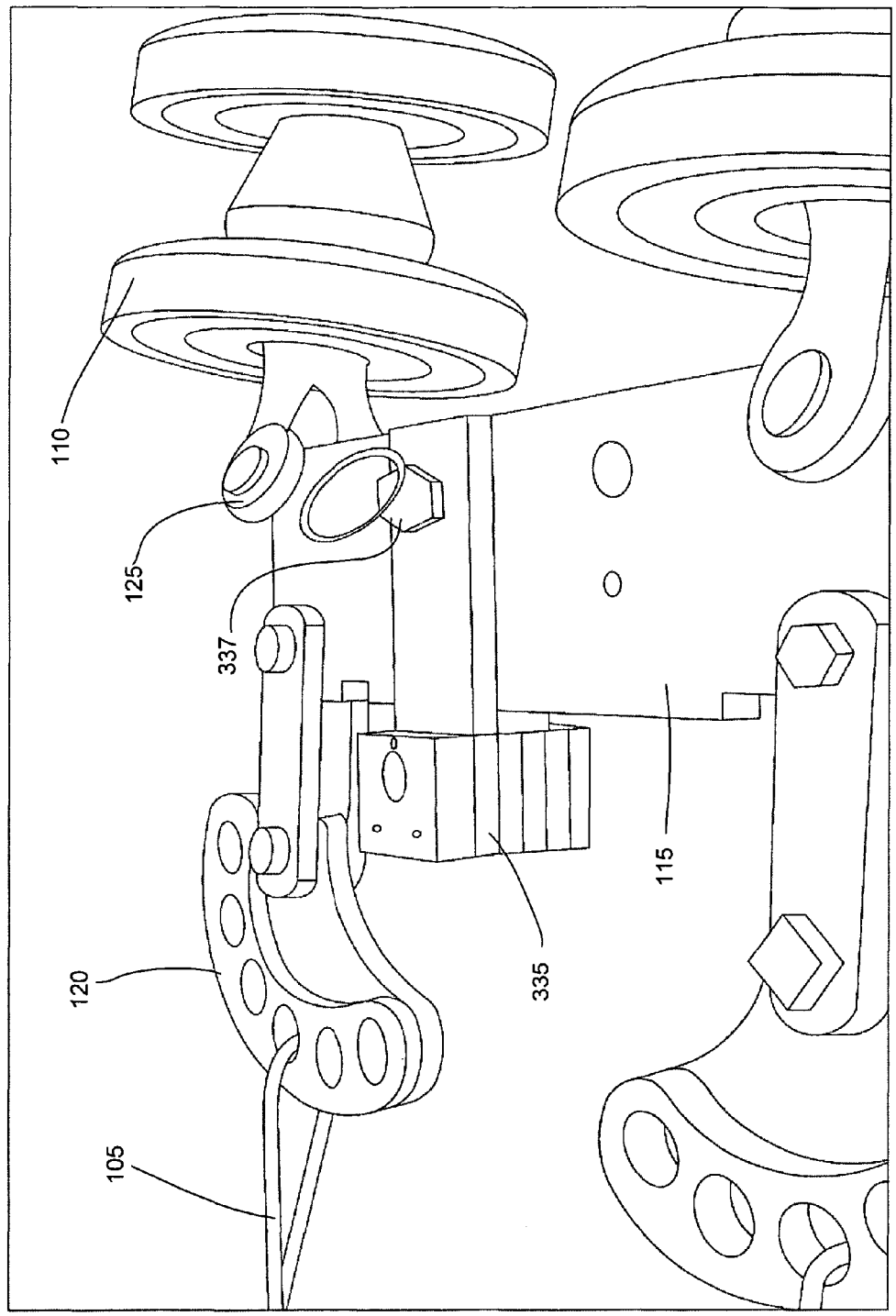
FIG. 9 is a top, perspective view of the yoke connection member secured to the adapter, in accordance with an exemplary embodiment of the present invention.
Figure 10:
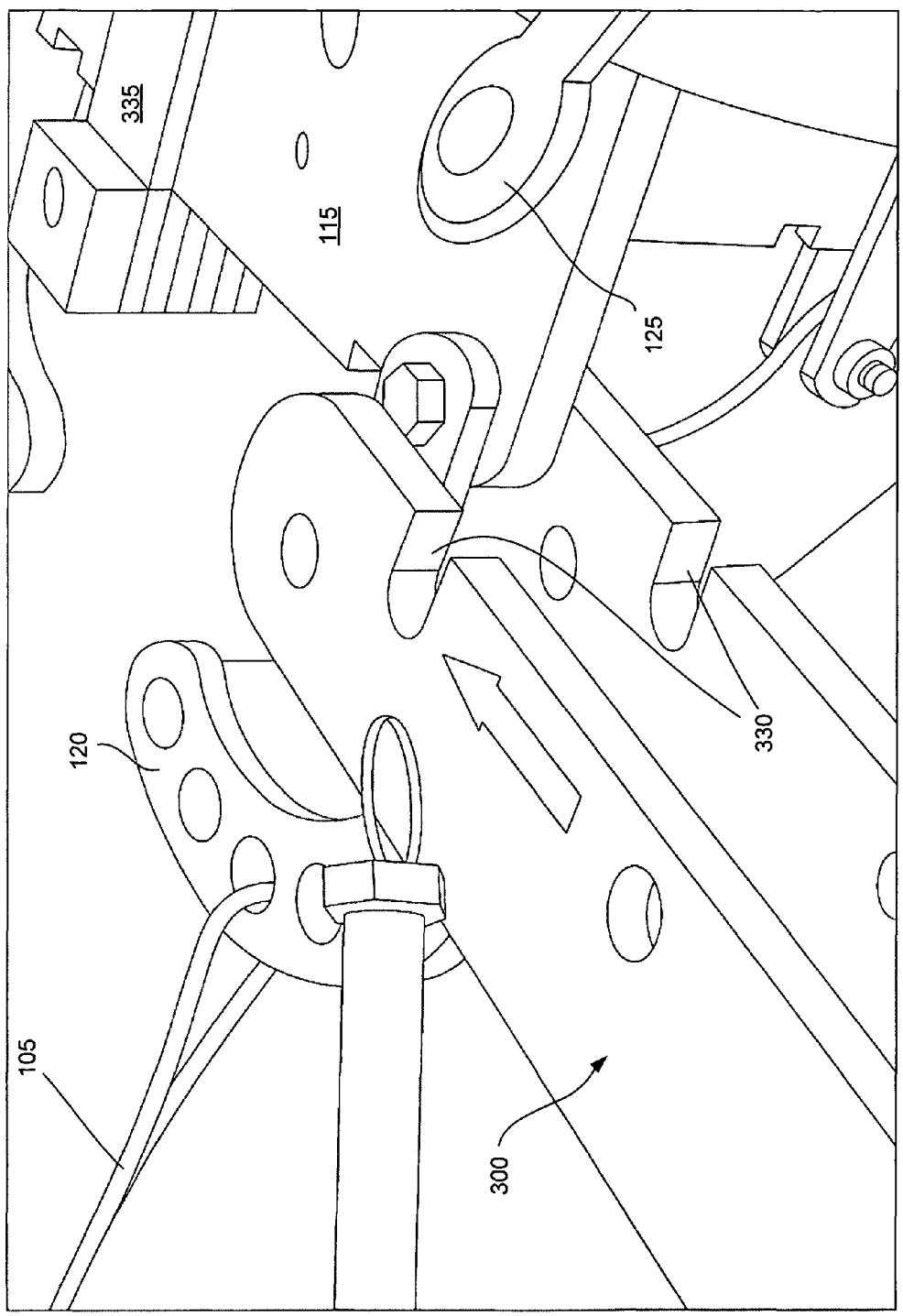
FIG. 10 is a top, perspective view of the yoke assembly being secured to the adapter, in accordance with an exemplary embodiment of the present invention.

As illustrated in FIGS. 9-10, the connection member 335 can slide over one end of the T of the T-adapter 115. In an exemplary embodiment, the connection member 335 can have a substantially rectangular-U-shape, such that the opening/mouth of the U can receive the end of the T of the T-adapter 115. The opening can be a distance Δd, with fits cooperatively about the T-adapter 115. The connection member 335 can be pinned to the T-adapter 115, by inserting a pin 337 through aperture of the mouth of the U, and through pre-existing holes in the connection member 335 and the pre-existing hole in the T-adapter 115. Likewise, a connection assembly 370 (e.g., a bolt/nut combination) can secure the opposing end of the connection member 335 to the end of the two plates 305 and 310, and through a pre-existing hole in the two plates 305 and 310. A close-up view of the connection member 335 is illustrated in FIG. 8.

As shown in FIGS. 3-7 and 10, the notch 330 of the yoke assembly 300 is a cavity carved out of the two plates 305 and 310 in the approximately same location. Depending on how the yoke assembly 300 is secured to the T-adapter 115, a flange of one of the T-ends may interfere with one of the plates 305 or 310 of the yoke assembly 300. The notch 330 is positioned in the correct, predetermined position having a receiving shape (such as a U-shape) as to not interfere with one of the ends of the T-adapter 115. For instance, because the connection member 335 is pinned in a pre-existing hole, the location of the notch 330 can be determined based on the location of the hole. Preferably, the size of the notch 330 is slightly larger than one end of the T.

The pin 365 can be a leveraging pin, which leverages a moment of force in the yoke assembly 300, further preventing it from rotation when the arm 350 is secured to the cold end, or pole side. The leveraging pin 365 is preferably positioned between the connection assembly 325 and the connection member 335. And the leveraging pin 365 is insertable into pre-existing holes in both plates 305 and 310. Preferably, it is inserted into the yoke assembly 300 after the plate 305 and 310 are secured to the T-adapter 115.

In proximity to the second end 320 of the plates 305 and 310 is the pole connector assembly 345 pivotably connected thereto for securing a pole between the yoke assembly 300 and the power pole 100. The pole connector assembly 345 can be pivotable about its connection assembly 340. The pole connector assembly 345 is connectable to an arm or pole 350, preferably made of a lightweight material, such as fiberglass. In a preferred embodiment, the pole 350 comprises non-conductive, or insulative, properties. For example, the fiberglass pole 350 is connected between the cold end, i.e., the power pole 100, and the yoke assembly 300. Once the pole 350 is connected therebetween, the pole 350 can reduce the amount of strain on the insulator string 110, such that one string 110 of insulators 112 will slacken, thereby being able to be repaired and/or removed. For example, the length of the pole 350 can be shortened, which can rotate the T-adapter 115 slightly to reduce the strain/stress on an insulator string 110 closest to the pole 350. Accordingly, the strain that was on the insulators 112 can shift to the pole 350, while still preventing rotation of the T-adapter 115.

A preferred method of installing the yoke assembly 300 includes first attaching the connection member 335 to the T-adapter 115, with a pin. Then, the first end 315 of the plates 305 and 310 of the yoke assembly 300 can slide over the outside of the hardware of the T-adapter 115. Now, the connection member 335 can be secured to the plates 305 and 310 with another connection assembly 340. Once the plates 305 and 310 are secured to the connection member 335, the notch 330 may engage the flange of the T-adapter 115. The leveraging pin 365 can then inserted in the two plates 305 and 310. Then, the arm 350 can be secured to the pole connector assembly 345. Next, the arm 350 can be tightened to reduce the strain on the insulator string 110 to be repaired/replaced. Because the strain on the insulator string 110 has been reduced, it can be removed and/or repaired, such that the arm 350 provides the stress required to maintain the tension on the conductors 105 and the remaining insulator strings 110.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A yoke assembly for relieving stress/strain on an insulator string, the insulator string comprising a plurality of insulators and the insulator string adapted to support a conductor via an adapter at a dead-end of a transmission power system, the yoke assembly comprising:
    a first support member having first and second ends;
    a second support member having first and second ends, the second support member in communication and aligned with the first support member;
    a connection member comprising a plurality of members each having an aperture in alignment at each distal end, the connection member carried by the first and second support members in proximity to the first ends of first and second support members, the connection member releaseably securable to the adapter; and
    a pole connector assembly comprising a single member having an aperture at a distal end, the pole connector assembly pivotably connected in proximity to the second ends of the first and second support members, the pole connector assembly adapted to carry a pole to relieve stress/strain on an insulator string;

wherein the first and second support members are spaced apart enough to fit over the adapter and hardware existing on the adapter and with said connection member and pole connector assembly being spaced apart from each other.

2. The yoke assembly according to claim 1, the pole positioned between the pole connector and dead-end for reducing stress/strain on the insulator string, and for reducing rotation on the adapter with respect to the dead-end.

3. The yoke assembly according to claim 1, the adapter comprising a T-shape.

4. The yoke assembly according to claim 3, the T-shaped adapter supporting three conductors, each positioned in proximity to an endpoint of the T-shaped adapter, and three insulator strings for insulating the three conductors from the dead-end of the transmission power system.

5. The yoke assembly according to claim 1, the first and second support members connected to one another via a number of pins, and being sufficiently spaced from one another to fit cooperatively on the outside of the adapter and its hardware.

6. The yoke assembly according to claim 1, the pole connector positioned between the two support members and secured thereto by a bolt/nut.

7. The yoke assembly according to claim 6, wherein an arm is securable between the pole connector and a power pole for reducing stress/stain on the insulator string.

8. The yoke assembly according to claim 7, wherein the arm comprises non-conductive material so that electrical current cannot pass from the conductor to the cold end.

9. A yoke assembly for repairing or replacing an insulator string in a transmission system, the transmission system comprising a conductor, an insulator string, an adapter that is configured to place the conductor in communication with the insulator string, and a cold end in communication with the insulator string, the yoke assembly comprising:

a first support member having first and second ends;

a second support member having first and second ends, wherein the first support member and the second support member are in communication and aligned with each other;

a connection member comprising a plurality of members each having an aperture in alignment at each distal end, the connection member releaseably connected to the adapter and to the first ends of the first and second support members; and a pole connector assembly comprising a single member having an aperture at a distal end, the pole connector assembly pivotably positioned in proximity to the second ends of the first and second support members, wherein the pole connector assembly is in communication with the first and second support members by means of a connection assembly;

wherein the yoke assembly is configured to be positioned about hardware of the adapter and with said connection member and pole connector assembly being spaced apart from each other.

10. The yoke assembly according to claim 9, wherein the connection member comprises an opening configured to receive the adapter.

11. The yoke assembly according to claim 9, wherein the connection member is secured to the adapter by a pin.

12. The yoke assembly according to claim 9, wherein the pole connector assembly is positioned between the first and second support members and wherein the connection assembly comprises a nut and bolt.

13. The yoke assembly according to claim 9, further comprising an arm having a first end and a second end, wherein the first end is in communication with the pole connector assembly.

14. The yoke assembly according to claim 13, wherein the second end of the arm is in communication with the cold end for reducing stress/strain on the insulator string.

15. The yoke assembly according to claim 13, wherein the arm comprises non-conductive material so that electrical current cannot pass from the conductor to the cold end.

16. The yoke assembly according to claim 13, wherein the arm comprises fiberglass.

17. The yoke assembly according to claim 9, wherein the first and second support members comprise a notch configured as to not interfere with the adapter.

18. The yoke assembly according to claim 16, wherein the notch is slightly larger than a first end of the adapter so that the yoke assembly does not interfere with the first end of the adapter.

19. The yoke assembly according to claim 9, wherein the first and second support members are connected to each other via a number of pins and are sufficiently spaced from one another to fit cooperatively on the outside of the adapter and its hardware.

20. A yoke assembly for relieving stress/strain on an insulator string of an electric power transmission system, wherein the insulator string is in communication with an adapter and a cold end, wherein the adapter comprises hardware, the yoke assembly comprising:

a first support plate having first and second ends;

a second support plate having first and second ends, wherein the first and second support plates are in communication and aligned with each other;

a connection member comprising a plurality of members each having an aperture in alignment at each distal end, the connection member releaseably coupled to the first and second support plates, wherein the aperture is configured to receive the adapter;

a pole connector assembly comprising a single member having an aperture at a distal end, the pole connector assembly in communication with the first and second support plates and configured to place the yoke assembly in communication with the cold end; and an arm having a first end and a second end and comprises non-conductive material so that electrical current does not pass through the arm from the first end to the second end, wherein the first end of the arm is releaseably connected with the pole connector assembly.

wherein the yoke assembly is configured to be positioned about the hardware of the adapter and with said connection member and pole connector assembly being spaced apart from each other.

* * * * *